United States Patent [19]

Dahlke

[11] Patent Number: 4,560,139

[45] Date of Patent: Dec. 24, 1985

[54] BAKERY PROOFER APPLIANCES

[76] Inventor: William R. Dahlke, c/o Aeromat Plastics, Box 52828, Lafayette, La. 70505-2828

[21] Appl. No.: 572,507

[22] Filed: Jan. 20, 1984

Related U.S. Application Data

[63] Continuation-in-part of Ser. No. 429,496, Sep. 30, 1982, abandoned.

[51] Int. Cl.$^4$ .............................................. B28B 7/36
[52] U.S. Cl. .................................... 249/112; 198/714; 198/803.14; 249/119; 249/137; 249/139
[58] Field of Search ............... 249/112, 119, 134, 137, 249/139; 426/696, 503; 198/646, 713, 714

[56] References Cited

U.S. PATENT DOCUMENTS

| 1,712,211 | 5/1929 | Hanson et al. | 198/714 |
| 3,021,695 | 2/1962 | Voigtmann | 249/134 |
| 3,146,730 | 9/1964 | White | 426/496 |
| 4,356,995 | 11/1982 | Lohner | 249/134 |
| 4,398,880 | 8/1983 | Seiling | 198/646 |

*Primary Examiner*—Robert Lindsay

*Attorney, Agent, or Firm*—Palmatier, Sturm, Sjoquist & Baker, Ltd.

[57] ABSTRACT

A proofer container for use in the baking industry fabricated of high-density material exhibiting substantial imperviousness to environmental contaminants. A unitary structure is provided with a suitably shaped dough-receiving receptacle and is configured to receive and contain a quantity of dough to be proofed, or raised in an intermediate step in the production of baked products. The unitary structure may be provided by use of a typical rotomolding process that is further enhanced by the insertion of a pin extending through an end wall of the mold and extending into the mold cavity to an adjacent section to a location so that the interior of the pin is spaced from the adjacent section by a distance substantially equal to the thickness of the walls of the tray to be fabricated. This step in the molding process provides a receptacle for a mounting pin or axle that is structurally sound and insures that the proofer tray has a continuous surface that is impervious to the entry of foreign contaminants to the interior of the hollow tray. The article produced according to this process provides features set forth above.

8 Claims, 13 Drawing Figures

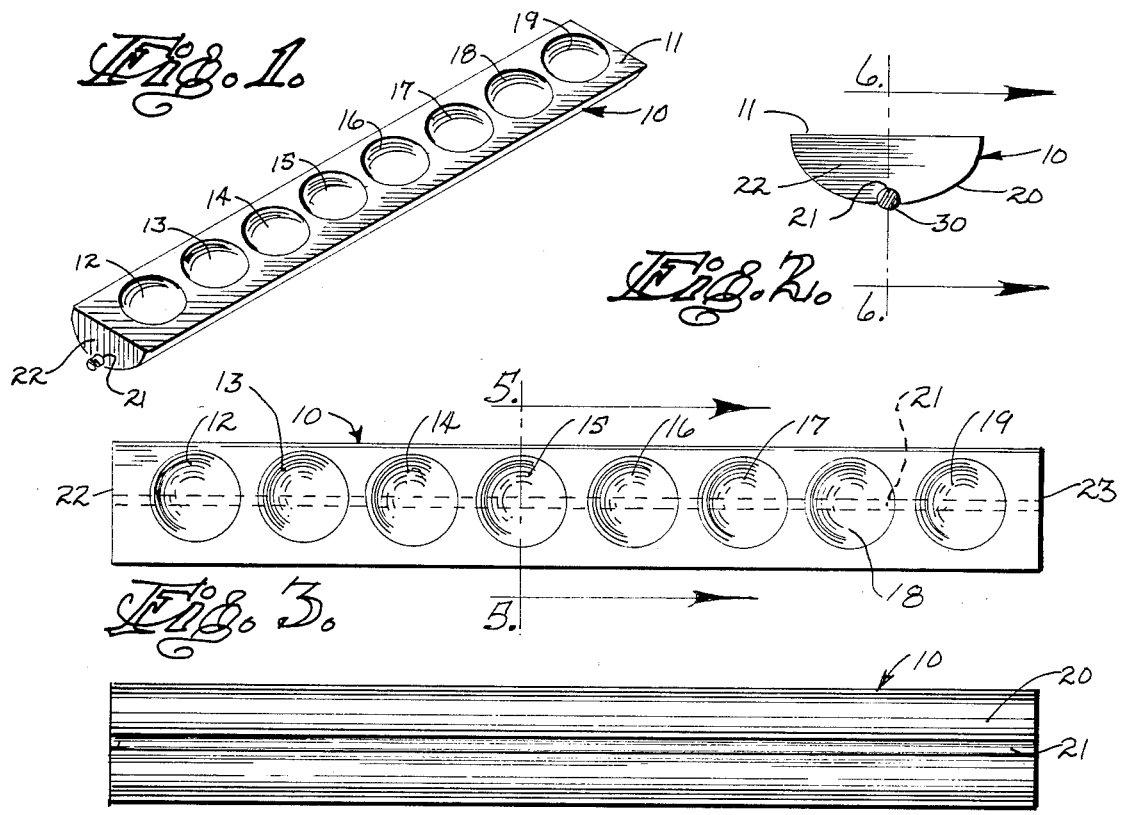

4,560,139

BAKERY PROOFER APPLIANCES

BACKGROUND OF THE INVENTION

This is a continuation-in-part of application Ser. No. 06/429,496, filed Sept. 30, 1982 abandoned.

FIELD OF THE INVENTION

This invention relates generally to appliances for the baking industry and is more particularly directed toward appliances having receptacles for receiving dough and the like and for supporting the same during an intermediate step in the creation of bakery products known as proofing or "raising". The proofing step in a baking procedure is undertaken by placing the appliances with the materials to be proofed in a controlled atmospheric location for a predetermined time interval.

PRIOR ART

A typical prior art appliance for proofing dough is comprised of a solid wooden structure having suitably shaped "pockets" or the like for receiving a quantity of dough to be proofed. The wooden trays are further typically designed to be carried on a conveyor which conveys the trays in and out of an enclosure presenting a controlled atmosphere with respect to temperature and the like for a predetermined time interval. Under customary operating conditions, the trays are "dusted" with flour so as to prevent sticking of the dough to the trays and, for some products, even this is insufficient to allow the proofed, or "raised" material to be released from the tray at the time of completion of the proofing step of the baking process. The wooden trays further required frequent maintenance and coating with materials designed to prevent the sticking of the dough as well as to attempt to tend to reduce the accumulation of undesirable deposits of materials present in the environment of the proofing operation as well as those used in the baking process. While the wood trays have apparently been developed to be acceptable in the sanitary sense, a thoughtful consideration of the characteristics of wood products can only lead to reasonable doubts in the minds of the operators of baking facilities as to the reliability of this conclusion.

BRIEF SUMMARY OF THE INVENTION

A proofer container for use in proofing bakery products is fabricated through the use of a process that will provide a hollow unitary structure having at least one dough-receiving receptacle for supporting the dough in a proofing environment. The hollow structure is fabricated of plastic material exhibiting a resistance and imperviousness to the environmental circumstances in a bakery production facility which may include dust, in the form of flour and other materials, oils, bacteria, molds, mildews and insects all of which represent undesirable contaminants that are hostile to the production of bakery products.

The proofing containers of my invention may also include structural elements in the form of metallic members disposed in proximity to the bottom of the container and retained in place in a state of tension. The containers are also fabricated to provide a configuration which presents a substantially smooth and continuous outer surface to aid in reducing the accumulation of undesirable contaminants.

In another embodiment of my invention, a proofer tray is provided to present a continuous impervious outer surface of the walls of the hollow structure formed by the process of rotomolding. This includes a suitable receptacle for mechanical support elements such as axle-pins so that the tray may be utilized on a continuous conveyor system for movement into and out of the atmosphere and environment necessary for the proofing step in a bakery. This is provided by the steps in a process of fabrication of the proofer tray which result in the structure that will be described in detail below.

A further modification and embodiment of my invention includes the presence of materials incorporated in or embedded in the structure to provide for the easy release of dough at the end of the raising or proofing step of the baking process. The illustrated embodiment of my invention, as described in greater detail below, may conveniently be fabricated in a process that is known as the rotational molding process for fabricating hollow structures of plastic materials, such as an LX 571 plastic resin.

These and other objects of my invention will become apparent from a consideration of the appended specification, claims and drawings.

BRIEF DESCRIPTION OF THE DRAWINGS

FIG. 1 is a perspective sketch of a bakery proofing tray embodying the principles of my invention;

FIG. 2 is an enlarged end view of the proofer tray illustrated in FIG. 1;

FIG. 3 is an enlarged top plan view of the proofer tray in FIG. 1;

FIG. 4 is an enlarged bottom plan view of the proofer tray shown in FIG. 1;

FIG. 5 is a sectional view taken along section line 5—5 in FIG. 3;

FIG. 6 is a fragmentary sectional view taken along section line 6—6 in FIG. 2;

FIG. 7 is a perspective sketch of a typical environmental proofing chamber including a conveyor and illustrating one use of the proofer tray illustrated in FIG. 1;

FIG. 8 is an enlarged perspective sketch of one end of the proofer tray illustrated in FIG. 1 and including a fixture for supporting the same in the environment shown in FIG. 7;

DESCRIPTION OF THE ILLUSTRATED EMBODIMENT

Figure 9:
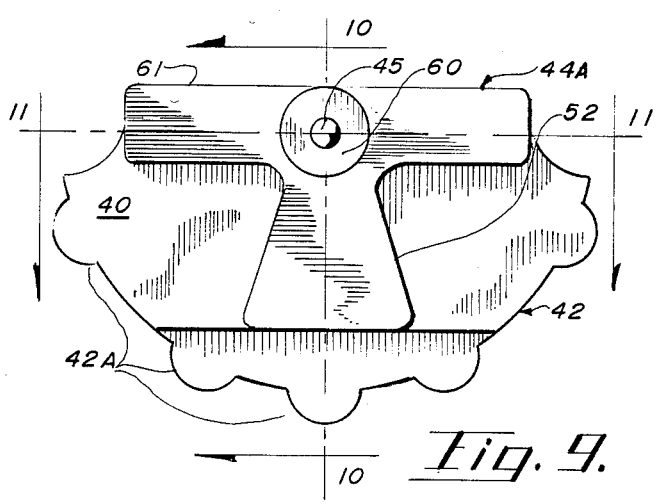
FIG. 9 is a side elevational view of another embodiment of my invention.

Referring to the drawings, my proofing tray, or container, is indicated generally by reference character 10 and includes a top surface 11; a plurality of dough-receiving receptacles or pockets 12, 13, 14, 15, 16, 17, 18 and 19; a rounded bottom surface 20, including a groove 21; and a pair of end surfaces of similar configuration, 22 and 23.

As illustrated in FIG. 8, tray 10 may be provided with a·suitable mounting bracket 24 including an outwardly extending pin 25 at each end for disposition on a suitable power conveyor so as to be pivotally supported for rotation about the longitudinal axis of tray 10 so as to allow upper surface 11 to remain in a substantially horizontal position for motion through the proofing environment as illustrated in FIG. 7. It is anticipated that the ends of tray 10 may be molded to provide a mounting pin and/or a cam surface to permit manipulation about the pivotal axis.

A tension bar, or rod 30 is shown disposed in groove 21 in the bottom 20 of tray 10 and may be suitably tensioned and retained in place by the use of a nut 32 disposed on threaded portions 31 provided at either or both ends of rod 30.

Referring to FIGS. 9-13, inclusive, of the drawings, another embodiment of my proofer tray is indicated generally by reference character 40. Proofer tray 40 includes a top portion 41 that is provided with a plurality of pockets 43, for receiving quantities of dough to be "proofed" or "raised", a bottom portion 42 that is provided with a plurality of longitudinally extending ribs 42A and right and left ends 44 and 44A respectively. A pin 45 extends outwardly from each of ends 44 and 44A and is used to rotatably support tray 40 as it passes through a proofing environment. It may be noted that tray 40 is comprised of a hollow structure with wall of substantially uniform thickness as indicated by reference character 47. In the environment of the disclosure, proofer tray 40 is designed so that when suspended by pins 45 at each end, it will assume the attitude shown in the end view of FIG. 9 and will continue this attitude as it proceeds through, for example, the conveyor apparatus shown in the environmental chamber of FIG. 7.

Ends 44 and 44A of proofer tray 40 may be similar in configuration as will be described below in greater detail or may simply provide a pin 45 to serve as a supporting axle, dependent upon the specific apparatus with which it may be used. Ends 44 and 44A are provided with an upwardly extending support portion formed, in part, by the adjacent wall members of proofer tray 40 and including, specifically, an outwardly extending cylindrical portion 60, a top surface 61 and a pair of horizontally spaced parallel outer and inner walls 62 and 63. A socket or receptacle 46 for axle-pins 45 is shown disposed as extending intermediate outer and inner walls 62 and 63. A cam 52 depends downwardly from the bottom of end 44A and is provided to coact with camming apparatus (not shown) that may be present, for example, at the outlet of environmental chamber 33 on FIG. 7 to empty the contents of pockets 43 on proofer tray 40 onto conveyor 37 after the "proofing" process has been completed.

Figure 10:
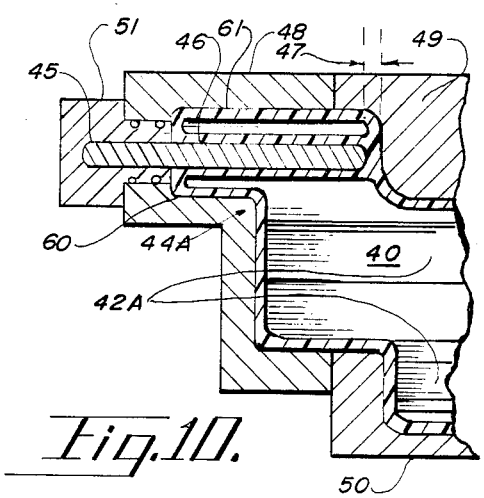
FIG. 10 is a fragmentary sectional view taken along section line 10—10 on FIG. 9.
Figure 11:
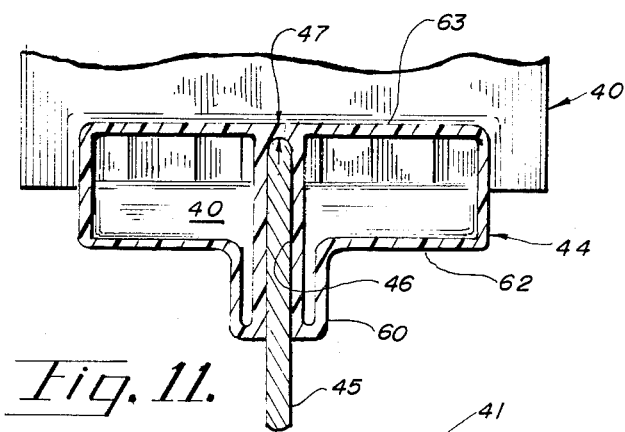
FIG. 11 is a fragmentary sectional view taken along section line 11—11 on FIG. 9.
Figure 12:
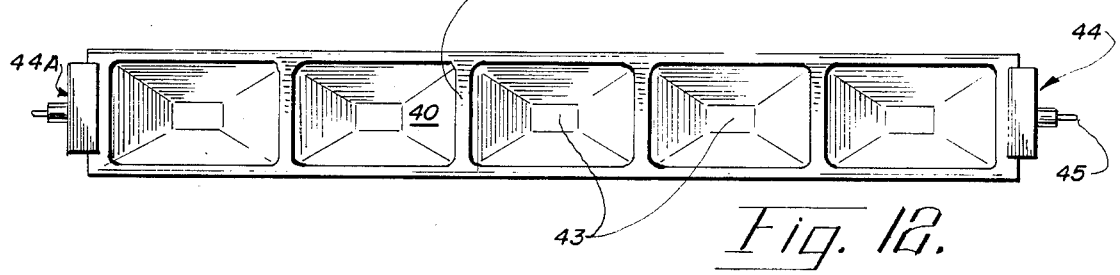
FIG. 12 is a top plan view of the embodiment of FIG. 9.
Figure 13:
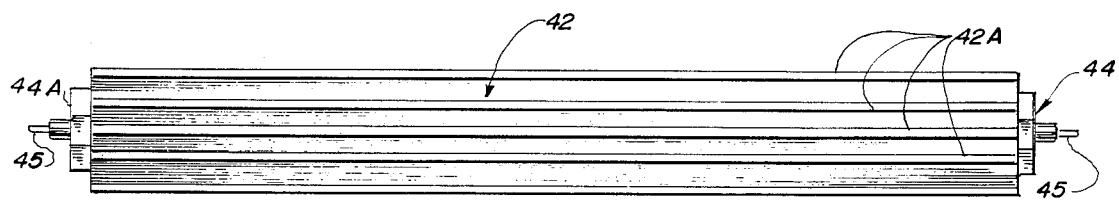
FIG. 13 is a bottom plan view of the subject matter of FIGS. 9, 10, 11 and 12.

FIG. 10 illustrates end 44A of proofer tray 40 in position in a mold therefor. The mold includes an end portion 48 and a pair of longitudinal portions 49 and 50 which define a cavity for receiving a quantity of the plastic material referred to above so as to provide a molded article in the form of a proofing tray 40 having walls of substantial uniform thickness and, in the case of the present embodiment, a structure that may be utilized in its operating environment in such a manner as to provide a continuous, impervious outer surface to preclude the immigration of contaminants into its hollow interior. The socket or receptacle 46 for pin-axle 45 is provided by placing a similar pin in a holding fixture, 51 that extends through an aperture provided in mold 48 and the pin is disposed so that its right end is spaced from the surface of mold 49 by an amount equal to the desired thickness of the walls of proofer tray 40. In the course of the rotational molding operation, the walls, of a substantial similar thickness, are formed as illustrated in FIG. 10. Upon cooling of the mold and the molded material, fixture 51 and molding pin 45 are removed as well as the mold elements 48, 49 and 50 and the product is ready for insertion of pin-axles 45 and installation in its operational environment. Pin-axles 45 may be held in place by suitable means as by knurled surfaces, serrations or striations formed in the surface of the pin-axle.

Referring specifically to FIG. 7, the typical proofing or raising enclosure of a bakery facility is indicated generally by reference character 33 and includes a continuous conveyor apparatus 34 that is typically provided with a loading station 35 and an unloading station 36 disposed in proximity to a conveyor 37.

The illustrated embodiment was fabricated of LX 571 plastic resin material which may be modified by the additions of small quantities of Teflon resin or silicone through the use of the well-known roto-molding process. The basic plastic resin was utilized because of its non-wetting properties as well as its imperviousness to dust, oils or other contaminants.

It is anticipated that the specific shape of a proofer tray may be of other configurations with respect to the dough receptacles commensurate with the type of bakery product under production.

OPERATION OF THE ILLUSTRATED EMBODIMENTS

After fabrication of trays 10 of suitable material and by a suitable process, the trays are readied for disposition on a suitable conveyor as illustrated in FIG. 7 of the drawings. This may be done by attaching ends 25 as by pop riveting or the like, or directly inserting pins 25 into ends 22 and 23, for rotatable disposition on conveyor 34 which is provided to have a generally serpentine configuration whereby trays 10 will assume and be maintained with top surface 11 in a generally horizontal position. Suitable quantities of dough are placed in receptacles 12-19 at the loading station 35 on conveyor 34 and the materials will be transported by conveyor 34 into and through the proofing enclosure 33 for a predetermined time, dependent upon the characteristics of the dough for any particular bakery product. When the trays reach the unloading station 36 on conveyor 34 a suitable means (not shown) may be utilized to control the disposition of the trays 10, with respect to conveyor 34 so as to cause tray 10 to assume an upside down position over conveyor 37 so as to discharge the proofed dough materials onto conveyor 37 for subsequent further operations in the bakery production process.

It may now be appreciated that proofer tray 40 of the embodiment of FIGS. 9-13, while similar in many respects, offers an advantage in that the entire structure is provided in a one step molding process to form an article with continuous and impervious walls so that the accumulation of foreign materials is precluded, a feature which presents substantial reduction in operational and maintenance procedures and the overall efficiency is increased by a great magnitude over that of prior art appliances. Further, there is a substantial cost efficiency provided by the flexibility in relation to the cost of fabrication as well as modifications as may be required for configuration of the ends, while still providing the feature of continuity and imperviousness to foreign matter.

It is anticipated that a proofer container may take the form of a large tub with a single receptacle for dough to be proofed or any other configuration that may prove practical with respect to the nature or size of the bakery product under production. The use of a suitable process for molding the proofers of plastic material presents a clean environment by eliminating contaminant collecting corners, crevices, or the like.

It may further be appreciated that the characteristics of the material of which the proofing containers of my invention are formed may be utilized in connection with other fabrication procedures such as vacuum forming, injection molding or the like. It may also be appreciated by those skilled in the art that the principles of my invention provide a proofer container which offers physical stability as well as great resistance to accumulation of contaminants, reduced maintenance costs and procedures and a reduction in weight and energy requirements.

Another feature of my proofer containers is the elimination of the use of parting materials, such as sleeves or wraps disposed on the surfaces of prior art trays to aid in the parting or release of the materials that have undergone the proofing step in the baking process and the release properties of the proofer trays may be enhanced by the use of suitable ingredients in the plastic resin of which they are fabricated, such as Teflon or nylon 6 or 12. In any event, the cleaning operation for the containers, if any, is substantially reduced and may be effected by, for example, a simple brush or broom should undesirable materials accumulate on the working surfaces of the containers.

I claim:

1. A lightweight, longitudinally elongated, hollow proofer tray comprising in combination;

a longitudinally elongated hollow housing having top bottom and end walls formed of a continuous layer of material impervious to the environmental conditions encountered in a proofing chamber, said hollow housing exhibiting a continuous outer surface characterized by smooth, crevice free transitions intermediate non-parallel portions thereof and culminating in a pair of vertically extending horizontally spaced apart inner and outer end walls at opposite ends of said housing, an upper surface extending intermediate said inner end walls and including a plurality of longitudinally spaced apart dough receiving pockets and a lower surface extending intermediate said outer end walls and the sides of said upper surface and extending downwardly therefrom to enclose the undersides of said end walls, upper surface and pockets in cooperative mutually supportive relationship, and including an integrally molded receptacle having a peripheral cylindrical wall connected to and disposed to extend intermediate opposed interiorly disposed sides of each of said pair of inner and outer end walls at a location above said upper surface, for rotably mounting said tray, thereby providing a lightweight hollow structure that is self supporting and is further characterized by providing a crevice-free, continuous outer wall and a sealed, contaminant free interior.

2. A proofer tray as set forth in claim 1 and including a plurality of upwardly and laterally extending rib portions intermediate the sides of the pockets disposed in the upper surface.

3. The subject matter of claim 1 in which the receptacles extend outwardly of each of the outer end walls.

4. The subject matter of claim 1 in which the receptacles are hollow for removably receiving an axle.

5. The proofer of claim 1 in which the lower surface of the housing includes a tensioned support means.

6. The proofer of claim 1 in which the high density plastic material includes a release agent.

7. The proofer of claim 1 in which the high density plastic material is resistant to wetting.

8. The proofer container of claim 1 in which the housing is hollow and is fabricated by the rotomolding process of manufacture.

* * * * *